(12) United States Patent
Yang

(10) Patent No.: US 11,978,347 B2
(45) Date of Patent: May 7, 2024

(54) METHOD AND APPARATUS FOR GENERATING DATA SET OF UNMANNED AERIAL VEHICLE

(71) Applicant: Electronics and Telecommunications Research Institute, Daejeon (KR)

(72) Inventor: Jeong Gi Yang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 230 days.

(21) Appl. No.: 17/123,945

(22) Filed: Dec. 16, 2020

(65) Prior Publication Data

US 2021/0209950 A1 Jul. 8, 2021

(30) Foreign Application Priority Data

Jan. 6, 2020 (KR) ........................ 10-2020-0001205

(51) Int. Cl.
*G08G 5/00* (2006.01)
*B64C 39/02* (2023.01)
*B64U 101/00* (2023.01)

(52) U.S. Cl.
CPC ........... *G08G 5/003* (2013.01); *B64C 39/024* (2013.01); *G08G 5/0021* (2013.01); *B64U 2101/00* (2023.01)

(58) Field of Classification Search
None
See application file for complete search history.

(56) References Cited

U.S. PATENT DOCUMENTS

| 2016/0070265 | A1* | 3/2016 | Liu ...................... B64C 39/024 701/25 |
| 2016/0335801 | A1 | 11/2016 | Yoon et al. |
| 2017/0092138 | A1* | 3/2017 | Trundle ................. F41H 11/00 |
| 2018/0089505 | A1 | 3/2018 | El-Khamy et al. |
| 2018/0292825 | A1* | 10/2018 | Smolyanskiy ....... G06V 10/764 |
| 2019/0037157 | A1 | 1/2019 | Matsumura |

(Continued)

FOREIGN PATENT DOCUMENTS

| JP | 6212788 B2 | 10/2017 |
| KR | 1020170010815 A | 2/2017 |

(Continued)

*Primary Examiner* — Maceeh Anwari
*Assistant Examiner* — Aarron E Santos
(74) *Attorney, Agent, or Firm* — William Park & Associates Ltd.

(57) ABSTRACT

A method for generating data sets of a UAV, performed by a data set generation apparatus, may comprise obtaining flight environment information including a moving object; obtaining flight data including first physical information and first sensor information of the UAV in a flight environment based on the flight environment information; obtaining second physical information and second sensor information of the UAV when the moving object exists, based on the flight data, and generating a first data set based on the second physical information and the second sensor information; obtaining third physical information and third sensor information of the UAV when the moving object does not exist, based on the flight data, and generating a second data set based on the third physical information and the third sensor information; and combining the first data set and the second data set to generate a third data set.

10 Claims, 3 Drawing Sheets

(56) References Cited

U.S. PATENT DOCUMENTS

| | | |
|---|---|---|
| 2019/0065885 A1 | 2/2019 | Li et al. |
| 2019/0088157 A1 | 3/2019 | Zhang et al. |
| 2019/0223237 A1 | 7/2019 | Hong |
| 2019/0253169 A1 | 8/2019 | Ha et al. |
| 2019/0339081 A1* | 11/2019 | Malhotra ................. G06T 1/00 |
| 2021/0166474 A1* | 6/2021 | Behar .................... G06V 20/56 |

FOREIGN PATENT DOCUMENTS

| | | |
|---|---|---|
| KR | 1020170029128 A | 3/2017 |
| KR | 1020190108831 A | 9/2019 |
| WO | 2008069366 A1 | 6/2008 |

\* cited by examiner

METHOD AND APPARATUS FOR GENERATING DATA SET OF UNMANNED AERIAL VEHICLE

CROSS-REFERENCE TO RELATED APPLICATIONS

This application claims priority to Korean Patent Application No. 10-2020-0001205 filed on Jan. 6, 2020 with the Korean Intellectual Property Office (KIPO), the entire contents of which are hereby incorporated by reference.

BACKGROUND

1. Technical Field

The present disclosure relates generally to a method and an apparatus for generating data sets of an unmanned aerial vehicle (UAV), and more specifically, to a method and an apparatus for generating experimental data sets capable of evaluating accuracies of algorithms for estimating a position of the UAV.

2. Related Art

Recently, researches on robots and unmanned aerial vehicles (UAVs) for disaster monitoring, environmental monitoring, reconnaissance, etc. are being actively conducted. In particular, researches on algorithms for estimating the position of robot or UAV, for example, simultaneous localization and mapping (SLAM) algorithm and visual inertial odometry (VIO) algorithm, are actively being conducted. Specifically, researches are actively being conducted to evaluate performances of the SLAM algorithm and the VIO algorithm for estimating the position of UAV. In order to analyze the performances of the algorithms accurately in various aspects, a data set including various information on a UAV should be generated more realistically and accurately. Accordingly, recently, a method of generating and synthesizing data sets of the UAV in a virtual environment has been studied.

When a user operates an actual UAV and obtains data sets, a process of obtaining the data sets is quite complicated, takes excessive cost and time, and accuracy of the data of the UAV is lowered. For example, there is an aspect that the position of the UAV is not accurately measured. However, when a user obtains the data sets using a virtual environment, the data may be obtained quickly and efficiently. In addition, the user can accurately control a surrounding situation (e.g., objects existing around the UAV, weather, and intensity of light) of the UAV to obtain accurate data corresponding to specific conditions.

On the other hand, conventional methods for obtaining data sets through a virtual environment have the following problems, That is, the process of generating the data sets by the user is complicated, it is difficult for the user to compare the performances of the corresponding algorithms through the generated data sets, and it is not easy to match the exact measurement periodicities between sensors because the measurement periodicities of the sensors that obtain data during the flight of the UAV are different.

SUMMARY

Accordingly, exemplary embodiments of the present disclosure are directed to providing a method and an apparatus for generating data sets capable of easily measuring robustness against moving objects existing around a UAV and increasing accuracies of SLAM algorithms and VIO algorithms, which are used for estimating the position of the UAV.

According to an exemplary embodiment of the present disclosure, a method for generating data sets of a UAV, performed by a data set generation apparatus, may comprise: obtaining flight environment information including a moving object; obtaining flight data including first physical information and first sensor information of the UAV in a flight environment based on the flight environment information; obtaining second physical information and second sensor information of the UAV when the moving object exists, based on the flight data, and generating a first data set based on the second physical information and the second sensor information; obtaining third physical information and third sensor information of the UAV when the moving object does not exist, based on the flight data, and generating a second data set based on the third physical information and the third sensor information; and combining the first data set and the second data set to generate a third data set.

Each of the first physical information, second physical information, and third physical information may include location information and attitude information of the UAV.

The generating of the first data set may comprise: generating first simulation data based on the first physical information and the first sensor information; and obtaining the first sensor information from a result of a simulation executed based on the first simulation data, according to a predetermined periodicity.

The first sensor information obtained according to the predetermined periodicity may be obtained through a plurality of sensors, and each of the plurality of sensors may have a different sensing periodicity.

Each of the plurality of sensors may obtain the first sensor information based on a sensing periodicity of a sensor whose sensing periodicity expires first among the plurality of sensors.

The plurality of sensors may include at least one sensor among a camera, a lidar, and an inertial measurement unit (IMU).

The generating of the second data set may comprise: generating second simulation data based on the second physical information and the second sensor information; and obtaining the second sensor information from a result of a simulation executed based on the second simulation data, according to a predetermined periodicity.

The third data set may include flight environment information including the moving object and flight environment information excluding the moving object.

Each of the first data set, the second data set, and the third data set may be generated in a form executable in a robot operating system (ROS).

According to another exemplary embodiment of the present disclosure, an apparatus for generating a data set of a UAV, the apparatus may comprise a processor; and a memory storing at least one instruction executable by the processor, wherein when executed by the processor, the at least one instruction may cause the apparatus to: obtain flight environment information including a moving object; obtain flight data including first physical information and first sensor information of the UAV in a flight environment based on the flight environment information; obtain second physical information and second sensor information of the UAV when the moving object exists, based on the flight data, and generate a first data set based on the second physical information and the second sensor information; obtain third physical information and third sensor information of the UAV when the moving object does not exist, based on the flight data, and generate a second data set based on the third physical information and the third sensor information; and combine the first data set and the second data set to generate a third data set.

Each of the first physical information, second physical information, and third physical information may include location information, velocity information, acceleration information, and attitude information of the UAV.

In the generating of the first data set, the at least one instruction max further cause the apparats to: generate first simulation data based on the first physical information and the first sensor information; and obtain the first sensor information from a result of a simulation executed based on the first simulation data, according to a predetermined periodicity.

The at least one instruction may further cause the apparatus to obtain the first sensor information through a plurality of sensors, and each of the plurality of sensors has a different sensing periodicity.

Each of the plurality of sensors may obtain the first sensor information based on a sensing periodicity of a sensor whose sensing periodicity expires first among the plurality of sensors.

Using the exemplary embodiments according to the present disclosure, a user may easily generate data sets of a UAV in a desired environment. In addition, since data sets are generated based on two cases, an environment where a moving object exists and an environment where a moving object does not exist, the user can easily grasp the effect of the moving object on algorithms. Further, the user may obtain data of the UAV by controlling a surrounding environment and a flight path, and thus obtain data sets specialized for analysis of position estimation algorithms. In addition, the user may obtain data with and without moving objects at the same time, and thus may easily analyze robustness of the algorithms against moving objects. In addition, the user may generate the data sets by accurately matching measurement periodicities of respective sensors, and thus, may easily grasp the performances of the algorithms. Further, since the data set includes not only the position of the UAV and sensor values, but also a 3D model of a map and images of the recognized objects, the user may analyze mapping accuracies of the algorithms by using the generated data sets, and analyze algorithms for identifying the moving objects.

DETAILED DESCRIPTION OF THE EMBODIMENTS

Figure 1:
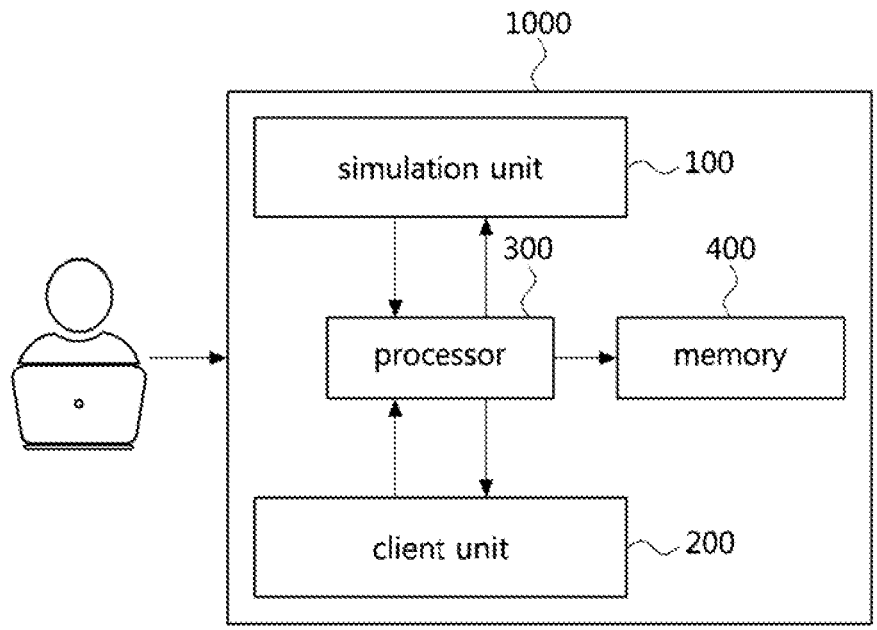
FIG. 1 is a block diagram illustrating an exemplary embodiment of a data set generation apparatus.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term"and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a block diagram illustrating an exemplary embodiment of a data set generation apparatus.

As shown in FIG. 1, the data set generation apparatus 1000 may comprise a simulation unit 100 for obtaining control data of an unmanned aerial vehicle (UAV) through a simulation of the UAV performed by a user, a client unit 200 for generating a data set of the UAV based on the control data generated by the simulation unit 100, a processor 300, and a memory 400. Here, the data set may refer to a data package including information on a flight environment in which an actual or virtual UAV flies, various sensor information obtained by flying (or piloting) the UAV, physical information of the UAV such as specifications, location, and attitude of the UAV, and/or the like.

The components included in the data set generation apparatus 1000 may be implemented by hardware or software. In addition, the hardware may include the memory 400, and logical components included in the data set generation apparatus 1000 may be implemented with at least one instruction recorded in the memory 400. In addition, the at least one instruction recorded in the memory 400 of the data set generation apparatus 1000 may be executed by the processor 300 of the data set generation apparatus 1000. The components included in the data generation apparatus 1000 may be interconnected to exchange data. Each of the components included in the data generation apparatus 1000 may be connected to the processor 300. For example, the simulation unit 100 and the client unit 200 may be connected to each other around the processor 300, and may perform operations through the at least one instruction executed by the processor 300. Hereinafter, the simulation unit 100 will be described in detail with reference to FIGS. 2 and 3, and the client unit 200 will be described in detail with reference to FIGS. 4 to 8.

Figure 2:
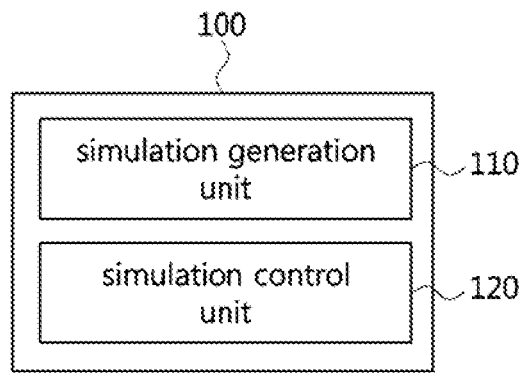
FIG. 2 is a block diagram illustrating an exemplary embodiment of a simulation unit.
Figure 3:
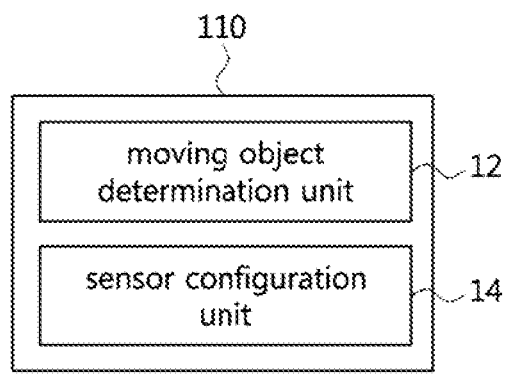
FIG. 3 is a block diagram illustrating an exemplary embodiment of a simulation generation unit.

FIG. 2 is a block diagram illustrating an exemplary embodiment of the simulation unit 100.

As shown in FIG. 2, the simulation unit 100 may include a simulation generation unit 110 and a simulation control unit 120.

The simulation generation unit 110 may generate a virtual simulation model for the UAV to perform a flight operation. Specifically, the simulation generation unit 110 may generate a simulation model by reflecting information on the UAV and environment information of the UAV. For example, the information on the UAV may be specification information of the UAV, the types and number of sensors included in the UAV, and the environment information of the UAV may be a map that includes information on obstacles around the UAV.

The simulation model generated through the simulation generation unit 110 may be generated in form of images or video. The simulation generation unit 110 may include a moving object determination unit 12 and a sensor configuration unit 14. The moving object determination unit 12 may store information on objects determined as moving objects among objects existing on the map. The sensor configuration unit 14 may store information sensors used when generating the simulation model. The simulation generation unit 110 may generate the simulation model based on information stored in the moving object determination unit 12 and information stored in the sensor configuration unit 14. In this case, the objects in the generated simulation mode, determined as moving objects by the moving object determination unit 12, may be configured to be displayed or excluded from the corresponding simulation model.

The simulation control unit 120 may receive control commands for the UAV performed in the simulation from the user, and may generate control data based on the control commands. The control data may be flight data of the UAV, which is obtained by controlling the UAV through commands through APIs or commands through a remote controller. The flight data of the UAV may include physical information and sensor information of the UAV. Meanwhile, the simulation unit 100 may be based on the Microsoft AirSim™, but is not limited thereto, and may be based on any simulator capable of simulating flight of the UAV under a specific condition.

Figure 4:
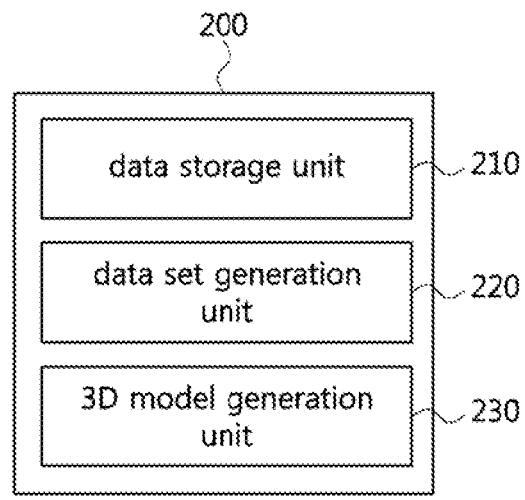
FIG. 4 is a block diagram illustrating an exemplary embodiment of a client unit.
Figure 5:
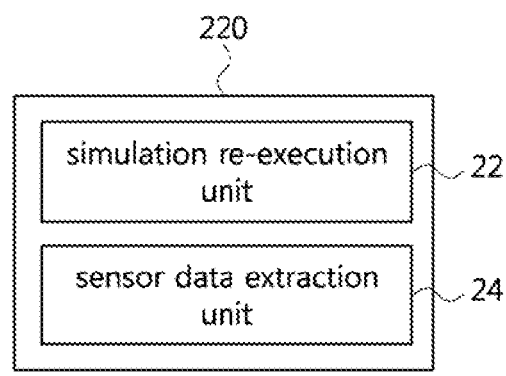
FIG. 5 is a block diagram illustrating an exemplary embodiment of a data set generation unit.

FIG. 4 is a block diagram illustrating an exemplary embodiment of the client unit 200, and FIG. 5 is a block diagram illustrating an exemplary embodiment of the data set generation unit 220 included in the client unit 200.

As shown in FIG. 4, the client unit 200 may include a data storage unit 210, a data set generation unit 220, and a 3D model generation unit 230. In addition, as shown in FIG. 5, the data set generation unit 220 may include a simulation re-execution unit 22 and a sensor data extraction unit 24.

The data storage unit 210 may store the simulation model generated by the simulation unit 100 and a series of information obtained through the simulation model. As an exemplary embodiment, the data storage unit 210 may store information on the simulation model, flight data of the UAV generated through the simulation control unit 120, and first physical information and first sensor information of the UAV when there is a moving object, which are obtained based on the flight data of the UAV. In addition, the data storage unit 210 may store second physical information and second sensor information of the UAV when there is no moving object, which are obtained based on the flight data of the UAV. Here, the first physical information and the second physical information, and the first sensor information and the second sensor information may be different from each other.

The first physical information may include location information and attitude information of the UAV flying in the environment where a moving object exists. In addition, the second physical information may include location information and attitude information of the UAV flying in the environment where a moving object does not exist.

The first sensor information and the second sensor information may be stored in various forms, in consideration of the types of the sensors (e.g., inertial measurement unit (IMU), global positioning system (GPS) sensor, barometer, camera, stereo camera, lidar, and the like) and characteristics (e.g., sensor noise, data acquisition periodicity, and the like) according to each sensor. For example, depending on conditions, only sensor information considering only the IMU sensor and the GPS sensor may be stored in the first sensor information and the second sensor information.

The data set generation unit 220 may generate a data set including the flight environment information, physical information, and sensor information of the UAV based on the data stored in the data storage unit 210. In this case, the data set generation unit 220 may extract the sensor information through the simulation re-execution unit 22 and the sensor data extraction unit 240.

Figure 6:
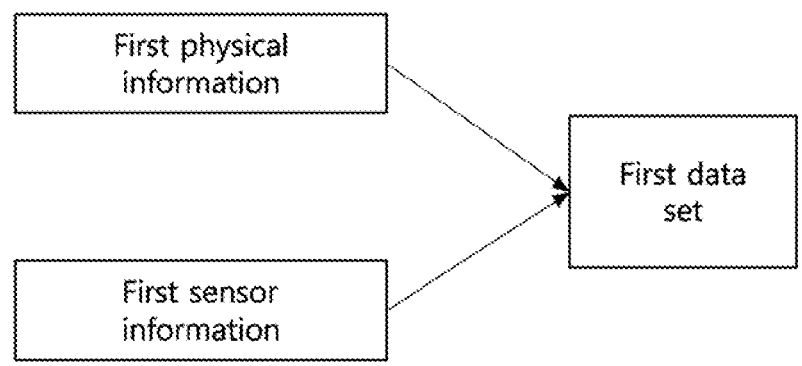
FIG. 6 is a conceptual diagram illustrating a process in which the data set generation unit generates a first data set.

Specifically, the data set generation unit 220 may generate a first data set based on the first physical information and the first sensor information. FIG. 6 is a conceptual diagram illustrating a process in which the data set generation unit 220 generates the first data set. As shown in FIG. 6, the data set generation unit 220 may generate the first data set based on the first physical information and the first sensor information stored in the data storage unit 210.

Figure 7:
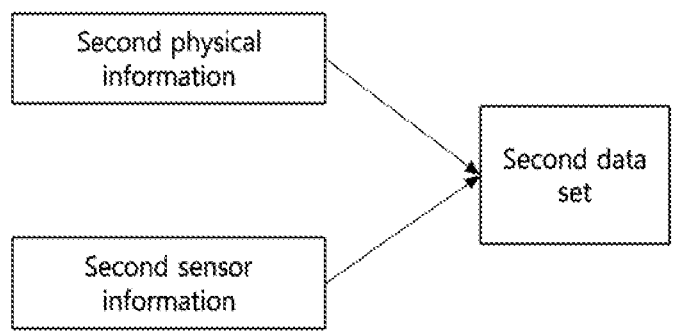
FIG. 7 is a conceptual diagram illustrating a process in which the data set generation unit generates a second data set.

Also, the data set generation unit 220 may generate a second data set based on the second physical information and the second sensor information. FIG. 7 is a conceptual diagram illustrating a process in which the data set generation unit 220 generates the second data set. Referring to FIG. 7, the data set generation unit 220 may generate the second data set based on the second physical information and the second sensor information stored in the data storage unit 210.

A process in which the data set generation unit 220 extracts the sensor information (e.g., the first sensor information or the second sensor information) will be described in detail. The data set generation unit 220 may extract the sensor information through the simulation re-execution unit 22 and the sensor data extraction unit 240. The simulation re-execution unit 22 may re-execute the simulation model stored in the data storage unit 210 at a slow speed (e.g., about 20 times slower than a normal simulation speed). In this case, the sensor data extraction unit 24 may pause the simulation model in consideration of the sensing periodicities (or measurement periodicities) of the plurality of sensors, and extract (or obtain) sensor information for each sensor. The sensor data extraction unit 24 may repeatedly extract the sensor information by repeatedly performing the above scheme. Here, each of the plurality of sensors may have a different sensing periodicity.

A process in which the data set generation unit 220 extracts the sensor information through the simulation re-execution unit 22 and the sensor data extraction unit 240 will be described in more detail. Each of the plurality of sensors may obtain the sensor information based on a sensing periodicity of a sensor whose sensing periodicity expires first among the plurality of sensors. Accordingly, the sensing periodicities of the respective sensors may be matched (aligned). For example, each of the plurality of sensors may have a timer having a different sensing periodicity value, and each of the plurality of sensors may obtain the sensor information based on the sensing periodicity of the sensor whose sensing periodicity expires first among the plurality of sensors. That is, each of the plurality of sensors may obtain the sensor information when a timer value of any one of the plurality of sensors becomes 0 (i.e., when the sensing periodicity expires), and then the simulation may be paused. In this case, each sensor may subtract the sensing periodicity value from its timer, and a sensor whose timer value becomes 0 among the plurality of sensors may obtain the sensor information. The timer of the sensor for which sensor information has been obtained may be initialized (or reset). The sensor for which sensor information has not been obtained may subtract the sensing periodicity value from its timer and continue to operate the tinier. When this scheme is repeatedly performed, sensors whose timers are set to 0 may obtain sensor information, and sensors whose sensing periodicities are not synchronized may extract sensor information according to their own sensing periodicities. The sensor information may be generated through kinematics calculations and stored in the data set. That is, the data set generation unit 220 may re-execute the simulation slowly, then execute the control data obtained by controlling the UAV by the user again, and pause and resume the simulation repeatedly according to the exact periodicity, thereby simultaneously generating the first data set considering the environment where a moving object exists and the second data set considering the environment where a moving object does not exist. The first data set and the second data set may be generated in forms that can be executed in a robot operating system (ROS).

Figure 8:
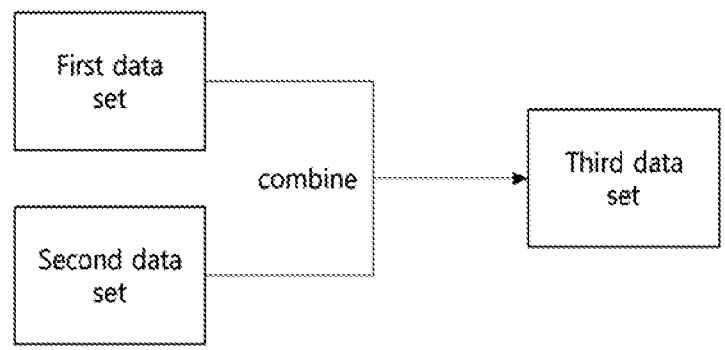
FIG. 8 is a conceptual diagram illustrating a process in which the data set generation unit generates a third data set.

Referring back to FIG. 4, the data set generation unit 220 may generate a third data set by combining the first data set and the second data set described above. FIG. 8 is the conceptual diagram illustrating a process in which the data set generation unit 220 generates a third data set. As shown in FIG. 8, the data set generation unit 220 may generate the third data set by combining the first data set generated in consideration of the existence of a moving object and the second data set generated in consideration that no moving object exists. Since the generated third data set is a data set generated in consideration of both the environment where a moving object exists and the environment where a moving object does not exist, the user may easily check the robustness of the model according to the existence of the moving object. Referring back to FIG. 4, the 3D model generation unit 230 may generate a 3D model based on information on the simulator used when generating the first data set and the second data set.

Figure 9:
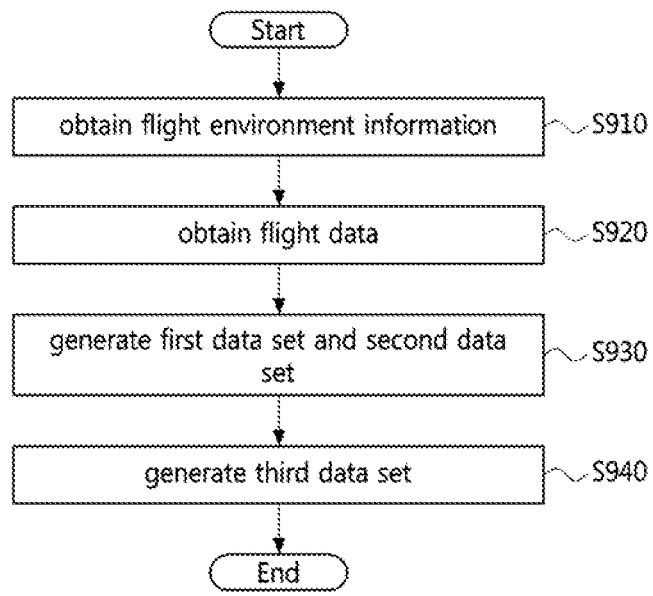
FIG. 9 is a flowchart illustrating an exemplary embodiment of a method for generating data sets of a UAV performed by a data set generation apparatus.

FIG. 9 is a flowchart illustrating an exemplary embodiment of a method for generating a data set of an UAV performed by a data set generation apparatus.

As shown in FIG. 9, the data set generation method performed by the data set generation apparatus may comprise a step S910 of obtaining flight environment information including a moving object, a step S920 of obtaining flight data by controlling (or piloting) a UAV in a flight environment reflecting the flight environment information, a step S930 of obtaining first physical information and first sensor information of the UAV in an environment where a moving object exists based on the flight data, generating a first data set based on the first physical information and the first sensor information, obtaining second physical information and second sensor information of the UAV in an environment where a moving object does not exists based on the flight data, and generating a second data set based on the second physical information and the second sensor information, and a step S940 of generating a third data set by combining the first data set and the second data set. The steps S910 to S930 may be performed through the interaction between the simulation unit 100 and the client unit 200. In addition, the step S940 may be performed by the client unit 200.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A method for generating data sets of an unmanned aerial vehicle (UAV), performed by a data set generation apparatus, the method comprising:
   processing computer executable program code embodied in non-transitory computer readable storage media by one or more processors, the computer executable program code comprising:
   obtaining program code that generates flight environment information including a moving object;
   obtaining program code that generates flight data of the UAV in a flight environment based on the flight environment information;
   obtaining program code that records first physical information and first sensor information of the UAV when the moving object exists, based on the flight data, and generating a first data set based on the first physical information and the first sensor information;
   obtaining program code that records second physical information and second sensor information of the UAV when the moving object does not exist, based on the flight data, and generating a second data set based on the second physical information and the second sensor information; and
   combining program code including the first data set and the second data set to generate a third data set, the generated third data set being a data set generated in consideration of both an environment where the moving object exists and an environment where the moving object does not exist,
   wherein the first physical information and the second physical information are different from each other in that the first physical information is obtained assuming a case when the moving object exists and the second physical information is obtained assuming a case when the moving object does not exist,
   wherein the first sensor information and the second sensor information are different from each other in that the first sensor information is obtained assuming a case when the moving object exists and the second second information is obtained assuming a case when the moving object does not exist,
   wherein the flight data is generated based on a simulator capable of simulating fight of the UAV,
   wherein the generating of the first data set comprises:
   generating first simulation data based on the first physical information and the first sensor information; and
   obtaining the first sensor information from a result of a simulation executed based on the first simulation data, according to a predetermined periodicity,
   wherein the first sensor information obtained according to the predetermined periodicity is obtained through a plurality of sensors, and each of the plurality of sensors has a different sensing periodicity, and
   wherein the simulation is paused and resumed repeatedly according to the predetermined periodicity.

2. The method according to claim 1, wherein each of the first physical information and second physical information includes location information and attitude information of the UAV.

3. The method according to claim 1, wherein each of the plurality of sensors obtains the first sensor information based on a sensing periodicity of a sensor whose sensing periodicity expires first among the plurality of sensors.

4. The method according to claim 1, wherein the plurality of sensors include at least one sensor among a camera, a lidar, and an inertial measurement unit (IMU).

5. The method according to claim 1, wherein the generating of the second data set comprises:
   generating second simulation data based on the second physical information and the second sensor information; and
   obtaining the second sensor information from a result of a simulation executed based on the second simulation data, according to a predetermined periodicity.

6. The method according to claim 1, wherein the third data set includes flight environment information including the moving object and flight environment information excluding the moving object.

7. The method according to claim 1, wherein each of the first data set, the second data set, and the third data set are generated in a form executable in a robot operating system (ROS).

8. An apparatus for generating a data set of an unmanned aerial vehicle (UAV), the apparatus comprising:
   a processor that processes computer executable program code embodied in non-transitory computer readable storage media, the computer executable program code comprising; and
   obtaining program code that generates flight environment information including a moving object;
   obtaining program code that generates flight data of the UAV in a flight environment based on the flight environment information;
   obtaining program code that records first physical information and first sensor information of the UAV when the moving object exists, based on the flight data, and generates a first data set based on the first physical information and the first sensor information;
   obtaining program code that records second physical information and second sensor information of the UAV when the moving object does not exist, based on the flight data, and generates a second data set based on the second physical information and the second sensor information; and
   combining program code including the first data set and the second data set to generate a third data set, the generated third data set being a data set generated in consideration of both an environment where the moving object exists and an environment where the moving object does not exist,
   wherein the first physical information and the second physical information are different from each other in that the first physical information is obtained assuming a case when the moving object exists and the second physical information is obtained assuming a case when the moving object does not exist,
   wherein the first sensor information and the second sensor information are different from each other in that the first sensor information is obtained assuming a case when the moving object exists and the second second information is obtained assuming a case when the moving object does not exist,
   wherein the flight data is generated based on a simulator capable of simulating fight of the UAV,
   wherein in the generating of the first data set, the at least one instruction further causes the apparats to:

generate first simulation data based on the first physical information and the first sensor information; and
obtain the first sensor information from a result of a simulation executed based on the first simulation data, according to a predetermined periodicity,
wherein the at least one instruction further causes the apparatus to obtain the first sensor information through a plurality of sensors, and each of the plurality of sensors has a different sensing periodicity, and
wherein the simulation is paused and resumed repeatedly according to the predetermined periodicity.

9. The apparatus according to claim 8, wherein each of the first physical information and second physical information includes location information, velocity information, acceleration information, and attitude information of the UAV.

10. The apparatus according to claim 8, wherein each of the plurality of sensors obtains the first sensor information based on a sensing periodicity of a sensor whose sensing periodicity expires first among the plurality of sensors.

\* \* \* \* \*